United States Patent Office 3,106,060
Patented Oct. 8, 1963

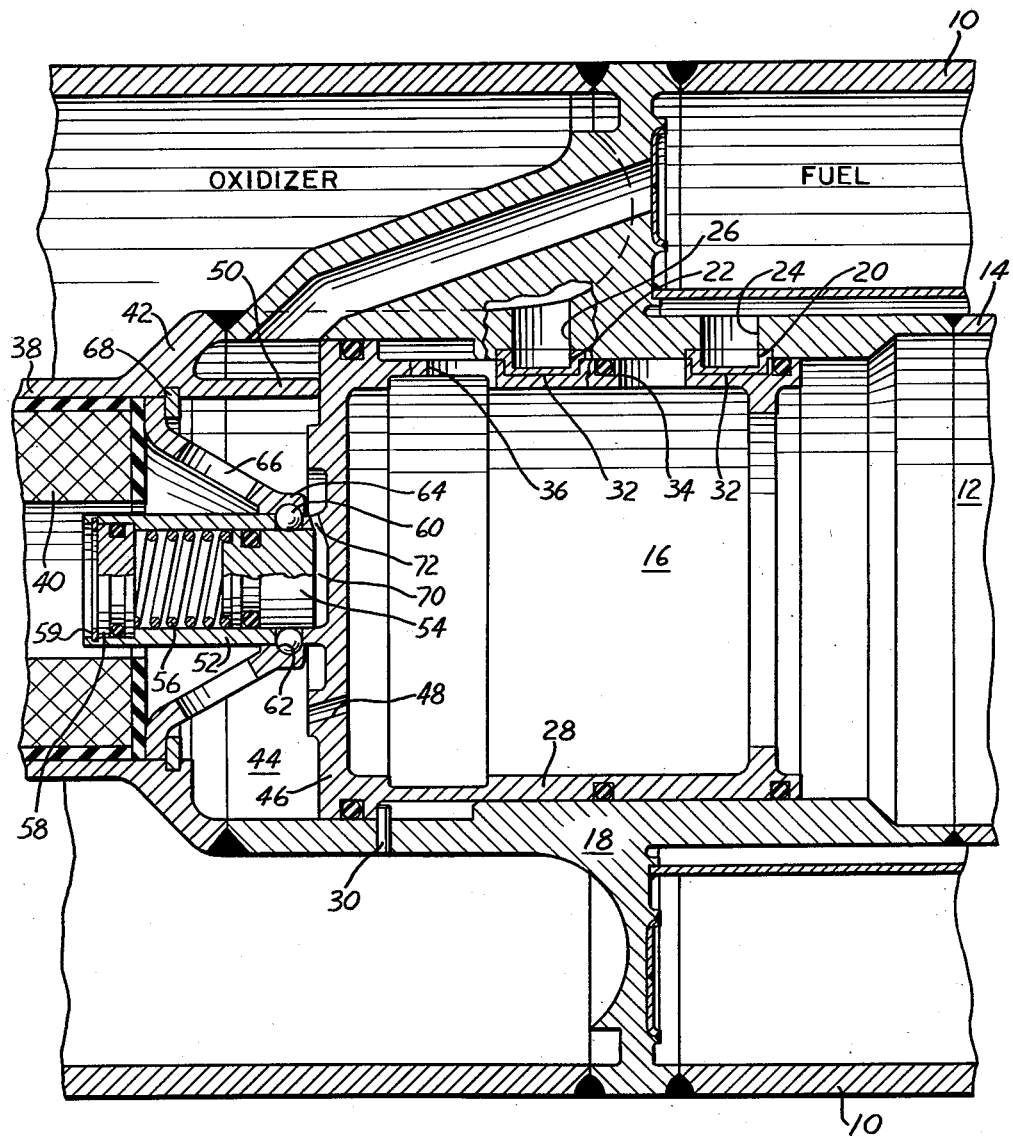

3,106,060
ROCKET MOTOR SAFETY DEVICE
Robert C. Comer, Prospect Park, N.J., assignor to Thiokol Chemical Corporation, Bristol, Pa., a corporation of Delaware
Filed Apr. 6, 1961, Ser. No. 101,301
5 Claims. (Cl. 60—35.6)

This invention relates generally to rocket powerplants and more particularly to means for preventing the accidental arming and firing of liquid fuel rocket motors.

Rocket powerplant units which are intended to be stored for indeterminate periods pending their use are well known. These units comprise a rocket motor and fuel and oxidizer tanks surrounding the motor in the powerplant casing. In one type of unit, the fuel and oxidizer are sealed against accidental leakage into the combustion chamber of the motor by means of rupturable diaphragms or shear cups supported in the fuel and oxidizer inlet ports to the combustion chamber by means of conforming recesses formed in a slide. Movement of the slide is prevented by a retaining pin which is adapted to be sheared by a given gas pressure when the rocket is fired.

While the necessary handling of the powerplant units incidental to their transportation and storage cannot normally result in accidental firing, excessive longitudinal shock loads of various kinds as, for example, are caused by accidentally dropping the unit on either of its ends from a considerable height has been known to cause firing.

When a unit is dropped from a height, the resulting high "g" loads on the shear slide may cause it to actuate, the movement shearing the retaining pin and the shear cups. The hypergolic combination of the fuel and oxidizer propellants is admitted to the combustion chamber through the inlet ports and ignition takes place. This in turn ignites the solid propellant gas generator of the rocket motor which pressurizes the fuel and oxidizer tanks to effect a full flow condition of the propellants as in a firing operation.

Accordingly, the main object of the present invention is to provide improved means for preventing the accidental arming and firing of liquid fuel rocket powerplants.

An important object of the present invention is to provide a mechanical retention mechanism for the shear slides of rocket motors which will resist the effect of dropping the motor on either end while at the same time permitting the shear slide to actuate during intentional firing of the rocket motor without requiring gas generator pressures higher than are required prior to incorporation of the mechanism.

Another important object of the present invention is to provide means for preventing the accidental arming and firing of rocket powerplants which means may be readily installed with only minor modifications and which will not interfere with normal firing of the powerplant nor require manual arming thereof.

A further important object of the present invention is to provide a practical mechanical retention mechanism for the shear slides of rocket motors which will be reliable in operation, susceptible of ready and economic manufacture and installation, and well within current technical capabilities as to the hardware requirements.

Other objects and advantages of the present invention will become apparent during the course of the following description.

In its broadest aspects the invention contemplates the holding of the shear slide against movement by mechanical means when the rocket motor is dropped or subjected to other forces tending to result in accidental slide movement.

In the drawings I have shown one embodiment of the invention. In this showing:

The single FIGURE of drawings is a fragmentary, central, longitudinal sectional view of the gas generator, tankage, and motor of a rocket powerplant.

Referring to the drawings, numeral 10 designates the outer casing of the powerplant in which the rocket motor is centrally positioned. The rocket motor includes a combustion chamber 12 defined by the cylindrical wall 14 which terminates in an exhaust nozzle (not shown), an injection chamber 16 defined by the wall 18 in which fuel and oxidizer inlet ports are formed and provided with diaphragm seals or shear cups 20 and 22 respectively to prevent passage of the propellants through the conduits 24 and 26 except when the rocket is intended to be fired.

An injector slide 28 is mounted in the injection chamber 16 and is fixed against movement by means of a shear pin 30. The periphery of the shear slide includes longitudinally spaced shear cup receiving and supporting recesses 32 and fuel and oxidizer inlet ports 34 and 36 which align with the open propellant conduits 24 and 26 respectively when the shear slide is moved to the right to shear off the cups 20 and 22.

A gas generator 38 including a solid propellant 40 is attached to the head 42 of the rocket motor and communicates with the space or chamber 44 between it and the head 46 of the shear slide 28. It will be understood that in normal operation the ignition of the solid propellant will generate pressure gases which:

(1) are conveyed by conduits to the fuel and oxidizer tanks to pressurize the same; and
(2) act against the slide head 46 to shear the pin 30, effect movement of the slide 28 to the right, shear off the cups 20 and 22 and align the slide ports 34 and 36 so as to admit pressurized fuel and oxidizer to the injection chamber 16 where their mixture and ignition is enhanced by pressure gases passing through one or more ports 48 in the slide head 46.

The mechanical shear-slide-holding means comprising the present invention includes separate means for each direction of potential movement of the slide.

As seen in the drawings, a plurality of angularly spaced, rearwardly and axially extending fingers 50 are fixed to the interior face of the combustion chamber head 42 and engage the shear slide head 46 to preclude movement of the slide toward the left if the rocket motor unit should be dropped on its head or forward end.

To prevent accidental slide movement to the right, a cylindrical extension 52 is fixed to and coaxially with the slide head 46 and extends through the space 44 and slightly within but spaced from the gas generator propellant 40. A piston 54 is mounted in the cylinder 52 and urged to the right end thereof by a spring 56 acting against a cylinder cover 58 which is sealed against entry of pressure gases by an O-ring and held in position by a retaining ring 59.

The inner end of the wall of the cylinder 52 is provided with a plurality of circumferentially spaced holes for the reception of ball detents 60 which are maintained against the piston 54 by an annular recess 62 formed in an end flange 64 of an apertureal, truncated conical ring 66. The otehr end of the ring is flanged and mounted in the combustion chamber head 42 by means of a split retaining ring 68. The piston 54 is slightly spaced from the head 46, to form a pressure chamber 70 by narrowing the inner base of the cylinder 52. Pressure gases are admitted to the pressure chamber 70 by a port 72 through the cylinder.

The forces involved in the retention of the shear slide 28 against movement in either direction are as follows:

$A_1$ = area of piston (in.$^2$)
$F_b$ = restraining force of ball detents (lbs.)
$F_s$ = spring force (lbs.)
$g$ = "g" load caused by "nozzle down" drop
$G$ = "g" load caused by "forward end down" drop
$P_b$ = pressure at which shear slide actuates (p.s.i.)
$P_o$ = ambient pressure (p.s.i.)
$P_p$ = pressure at which piston actuates (p.s.i.)
$W_1$ = weight of shear slide (lbs.)
$W_2$ = weight of piston (lbs.)

$$P_b > P_p > P_o$$
$$F_b > W_{1(g)}$$
$$F_s > W_2(G)$$
$$P_p A_1 \approx 1.5(P_o A_1 + F_s)$$

It will now be readily apparent that the spring 56 must support only the force of the mass of the piston 54 acting under the load caused by dropping the rocket motor unit on its forward end ($W_2G$)—the slide 28 being supported by the rigid stop fingers 50. Similarly, the slide 28 must be mechanically held by the detent balls 60 against the force caused by dropping the unit on its nozzle end ($W_{1g}$) and with the stop fingers 50 against a force caused by dropping the unit on its forward end ($W_1G$). Thus, the fingers 50 and the ball detent mechanism effectively function as slide retention mechanism against in either direction.

There is no interference with normal operation of the rocket motor by the slide retention mechanism described. When the rocket motor is to be fired, the solid propellant 40 of the gas generator 38 is ignited and the resultant pressure gases, in addition to the functions previously described, enter the pressure chamber 70 by the port 72 and force the piston 54 forwardly against the spring force ($F_s$) allowing the detent balls 60 to be pushed inside the cylinder 52. This releases the shear slide 28 from the conical ring 66 for the normal operation previously described under pressure ($P_b$).

Thus the slide retention means described does not interfere with conventional rocket motor operation and the slide is automatically armed when the motor is fired.

It is to be understood that the form of my invention herewith shown and described is to be taken as a preferred example of the same and that various changes in the shape, size and arrangement of parts may be resorted to without departure from the spirit of the invention or the scope of the subjoined claims.

I claim:
1. In combination, a rocket motor having a combustion chamber terminating in an exhaust nozzle, a gas generator fixed to and communicating with the head of the combustion chamber, propellant inlet ports formed in the wall of the chamber, slide means mounted in the chamber and having a head spaced from the head of the chamber to define a pressure chamber therewith, shear cups sealing said ports mounted in said slide means and adapted to be sheared upon movement of said slide means to admit propellant to the chamber, propellant tanks surrounding said combustion chamber and communicating with said inlet ports and with said pressure chamber, said shear slide being movable with respect to said generator by pressure gases therefrom acting on said slide head, and retention means fixed to the head of the chamber and engaging said slide means to prevent movement thereof.

2. The combination recited in claim 1 wherein said retention means comprises a plurality of angularly spaced rigid fingers mounted in the head of the combustion chamber and extending rearwardly and axially through said pressure chamber into engagement with the head of said slide means to prevent movement thereof toward the head of the chamber.

3. The combination recited in claim 1 wherein said retention means comprises ball-retaining apertures formed in the slide means, a conical ring fixed to the combustion chamber head and including an annular recess positioned closely adjacent said apertures, and ball detents mounted in and substantially filling said apertures and recesses to prevent relative longitudinal movement between said fixed ring and said slide means.

4. The combination recited in claim 1 wherein said retention means comprises a cylinder mounted on said slide means and extending toward the combustion chamber head, a plurality of apertures formed in said cylinder, a conical ring fixed to and extending from the chamber head and including an annular recess surrounding said cylinder and closely adjacent to said apertures, a plurality of ball detents positioned in said apertures and in said annular recess to prevent relative longitudinal movement of said slide means with respect to said ring, and a piston slidable in said cylinder and closing said apertures to retain said detents therein.

5. The combination recited in claim 4 wherein conduits connect said pressure chamber with the interior of said cylinder and said piston is responsive to pressure gases from the gas generator to move away from said apertures and permit said ball detents to drop therethrough and release said slide means upon operation of the rocket motor.

References Cited in the file of this patent
UNITED STATES PATENTS

| | | |
|---|---|---|
| 2,659,517 | Reinhardt | Nov. 17, 1953 |
| 2,940,256 | Conyers et al. | June 14, 1960 |
| 2,954,670 | Helus et al. | Oct. 4, 1960 |
| 2,992,528 | Ozanich et al. | July 18, 1961 |